(No Model.)  3 Sheets—Sheet 1.
H. C. CROWELL.
MACHINE FOR SAWING SEGMENT BLOCKS.
No. 275,807. Patented Apr. 17, 1883.
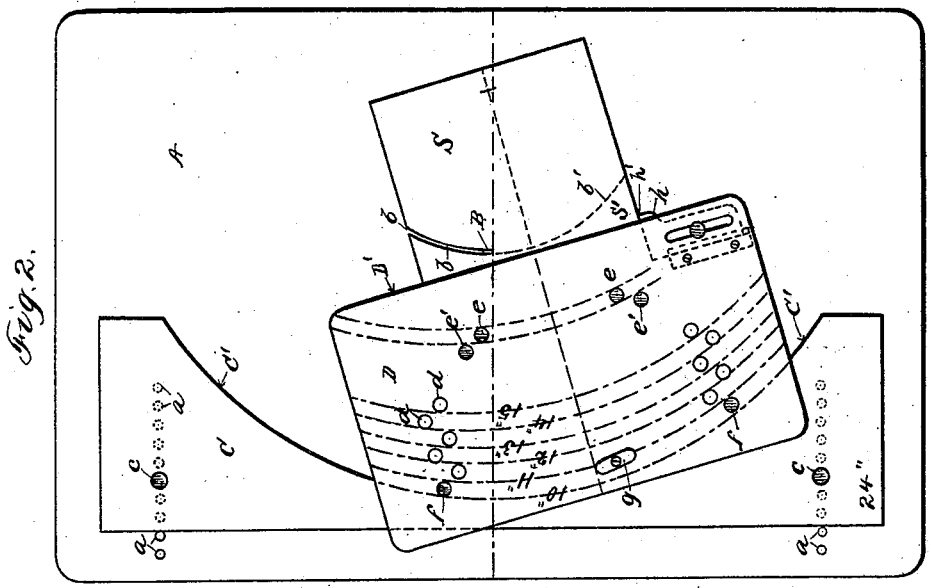
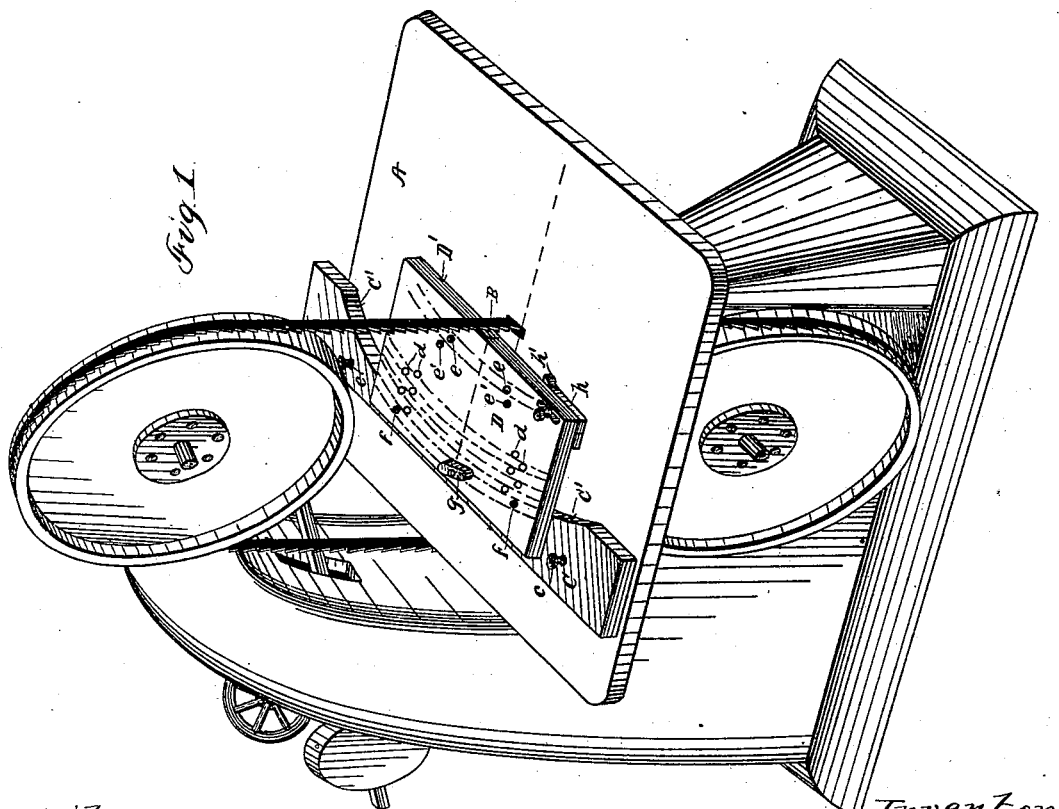
Witnesses
W. R. Edelen
Robt H. Porter
Inventor
H. C. Crowell
per Hallock & Hulbert
Att's.

(No Model.) 3 Sheets—Sheet 2.
H. C. CROWELL.
MACHINE FOR SAWING SEGMENT BLOCKS.
No. 275,807. Patented Apr. 17, 1883.
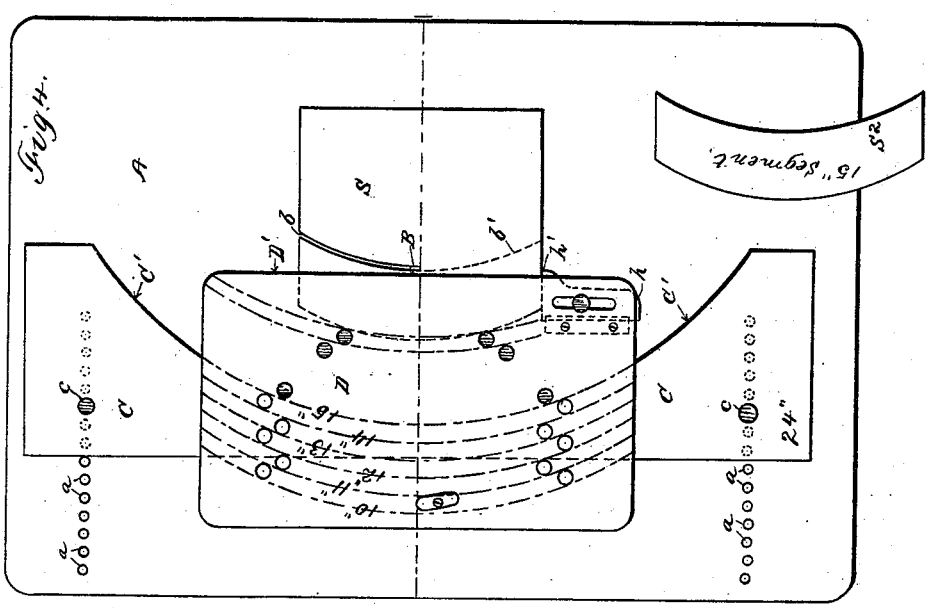
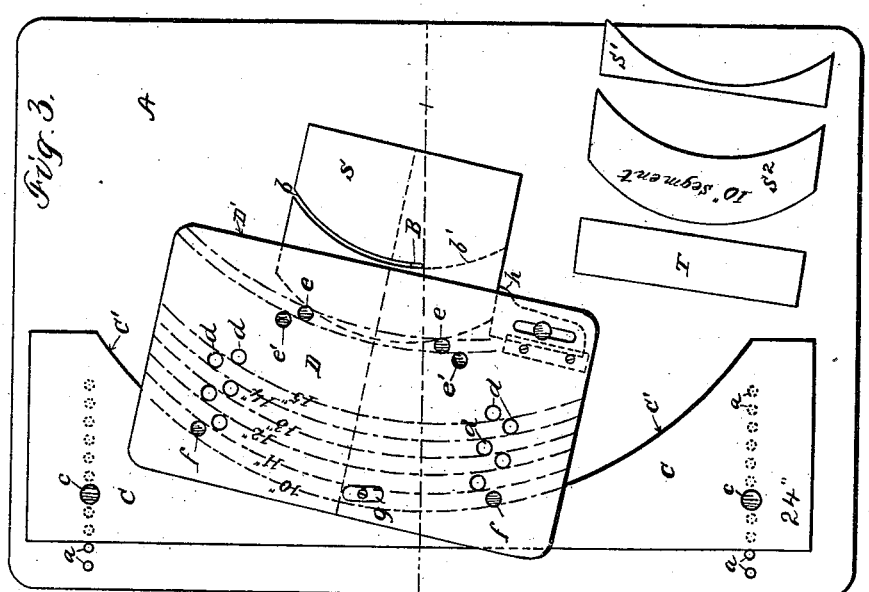
Witnesses.
W. R. Edelen
Robt H. Porter.
Inventor.
H. C. Crowell
Per Hallock & Hallock
Att's (No Model.) 3 Sheets—Sheet 3.
H. C. CROWELL.
MACHINE FOR SAWING SEGMENT BLOCKS.
No. 275,807. Patented Apr. 17, 1883.
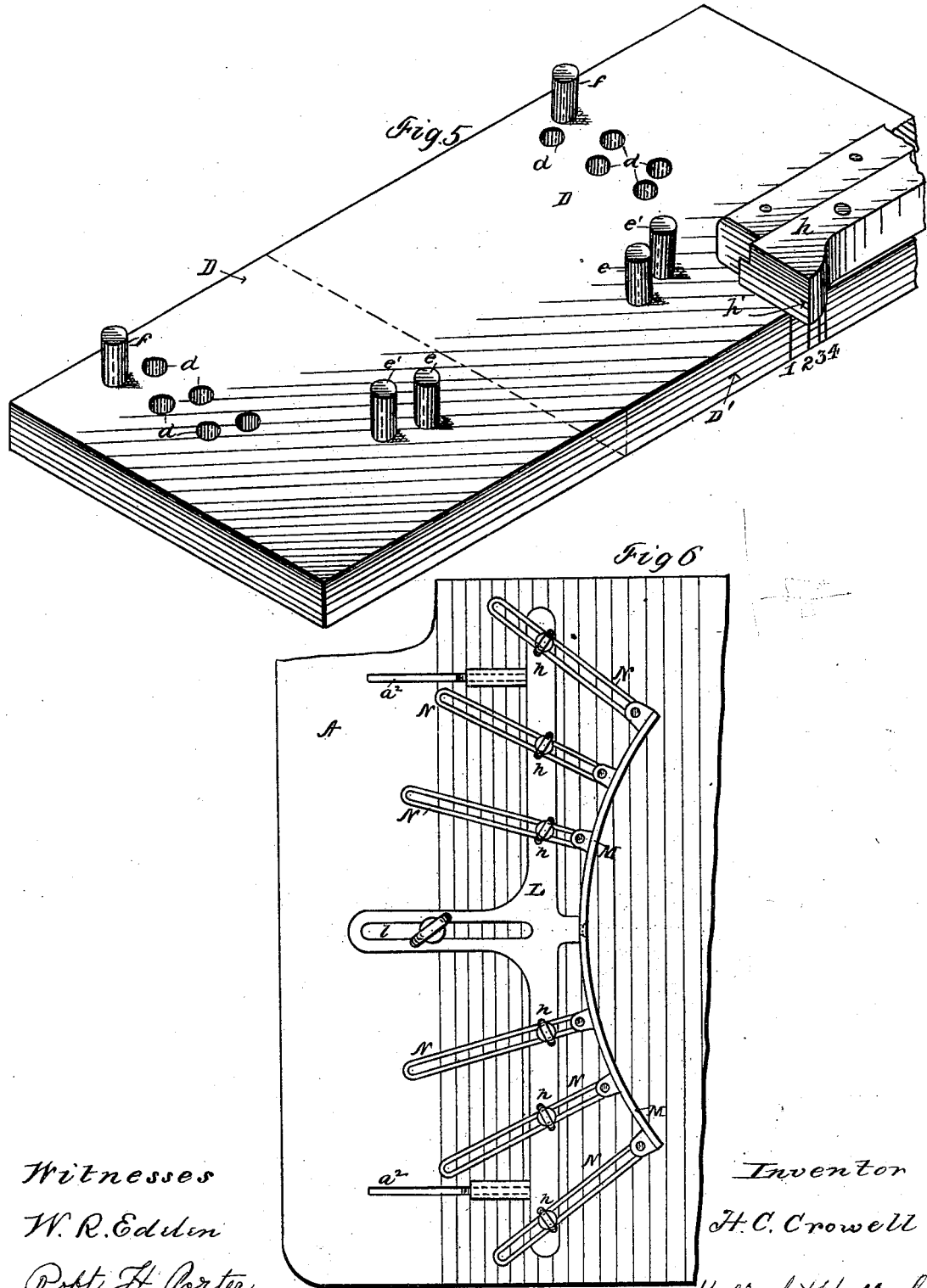
Witnesses
W. R. Edden
Robt. H. Porter.
Inventor
H. C. Crowell
Per Hallock & Hallock
Att'ys

UNITED STATES PATENT OFFICE.

HILEN C. CROWELL, OF ERIE, PENNSYLVANIA.

MACHINE FOR SAWING SEGMENT-BLOCKS.

SPECIFICATION forming part of Letters Patent No. 275,807, dated April 17, 1883.

Application filed January 30, 1883. (No model.)

*To all whom it may concern:*

Be it known that I, HILEN C. CROWELL, a citizen of the United States, residing at Erie, in the county of Erie and State of Pennsylvania, have invented certain new and useful Improvements in Machines for Sawing Segment-Blocks; and I do hereby declare the following to be a full, clear, and exact description of the invention, such as will enable others skilled in the art to which it appertains to make and use the same.

This invention relates to methods and devices for sawing segment-blocks for fellies, rims of wooden pulleys, and other purposes.

The object of this invention is to provide a system of gages and guides by which any ordinary gig and band saw may be employed to saw segment-blocks of any desired radius without marking out the work or requiring any care in guiding the stuff to the saw.

The invention consists in providing an adjustable segmental guide to be fixed to the saw-table, and an adjustable gaging feed-block or carrier which holds the stuff when being sawed, and is guided by the adjustable segmental guide. The adjustable guide is adjustable from and toward the saw, and it may have an adjustable arc, or a series of guides having differing arcs is provided. If the saw-table would permit of sufficient latitude of adjustment of the guide, which is impracticable, no change of arcs would be required, but there is sufficient latitude for adjustment to enable me to saw segment-blocks of several different radii from the same segment-guide.

This invention is very useful in the manufacture of wooden pulleys the rims of which are built up of segment-blocks laid so as to break joint. These pulleys are made in all sizes, from less than a foot to more than twelve feet in diameter. In shops where these pulleys are made thousands of segment-blocks are used which range in length of radius from less than six inches to more than six feet. Hence it will at once appear that the adaptation of an ordinary scroll sawing machine by a simple system of guides and gages to cut such a large variety of segment-blocks and have all of a kind exactly alike without marking out or laying off the stuff from which they are made or the exercise of any care in guiding the stuff to the saw more than is used to saw off a straight cut will save much time and insure more perfect work.

This invention is illustrated in the accompanying drawings as follows:

Figure 1 is a perspective view of an ordinary band sawing machine with my device in place thereon ready for work. Fig. 2 is a plan view of the saw-table with my device in operation thereon. Fig. 3 is a like view showing the work farther progressed, the first cut or waste, S', and one segment-block $S^2$, having been cut, and the saw B is shown farther advanced in the blank S. Fig. 4 is a like view showing a changed position of the parts D and S. Fig. 5 is a perspective view of the feed block or carrier D turned on its back. Fig. 6 is a plan view of an adjustable guide with an adjustable arc, the other figures having shown guides C with fixed arcs.

A is the saw-table. B is the saw. C is the adjustable guide. *c c* are the adjusting-pins, and *a a* the pin-holes in the table. D is the adjustable gaging feed-block or blank-carrier. *d d*, &c., are the guide-pin holes in the block D. *f f* are the guide-pins. *e e'* are gage-pins in the block D. *h* is a gage-block and pusher or blank-rest on the under side of the block D. *g* is a thumb-piece on the top of the block D. S is the blank to be sawed, and S' and $S^2$ pieces cut from the blank.

Figures 10, 11, 12, &c., on the block D indicate in inches the diameter-line of the segments which can be sawed when the pins *f f* are set in the holes *d* nearest said lines, or, in other words, the diameter of the wheel which those segments will produce.

In Figs. 2 and 3 the device is set for sawing segments for a ten-inch pulley. In Fig. 4 it is set for sawing segments for a fifteen-inch pulley. In the shop these segments are known as "ten-inch" segments or "fifteen-inch" segments, and so on, according to the size of pulley or wheel they will make, and they will be so referred to here. By observing Figs. 3 and 4 it will be seen that the guides C are the same— namely, twenty-four-inch arc, or an arc of a twenty-four-inch circle—and that to cut a fifteen-inch segment the guide C is much nearer the saw than when cutting a ten-inch segment, as in Fig. 3, and that the guide-pins *f* are on the fifteen-inch line in the block D, which line is nearer the saw than when in the ten-inch line. From this it will be seen that the nearer the guide is to the saw the larger the segment. The guide in Fig. 4 is as near the saw as the construction of the carrier-block D will permit, and there must always be space enough for the segment being cut and the gage and guide pins. As shown, there is four and a half inches space between the saw and the face of the guide C in Fig. 4. This four and a half inches is a radius which doubled makes a diameter of nine inches, which added to fifteen inches, the size of the segment being sawed, gives twenty-four inches—the size of the guide. This will afford an understanding of the system of guides and gages I employ. For instance, to saw a thirty-inch segment, we will suppose the carrier-block to have its thirty-inch guide in the same position as the fifteen-inch arc in the block shown. So we will see that a thirty-nine-inch guide, C, must be employed; but if the thirty-inch guide-pins should be on the outside of the block D, as ten is in the figure shown, then a forty-four inch guide C could be used.

For convenience on an ordinary sized saw-table, I plan the parts C and D, so as to cut six different sizes, as shown, from ten to fifteen inch segments, or from sixteen to twenty-two, or from twenty-three to twenty-nine—that is to say, I use a series of sets of guides and carriers, as above, so that with a twenty-four inch guide and a carrier with guide-pin holes arranged in arcs, as shown, I can cut segments for pulleys from ten to fifteen inches diameter, inclusive, simply by changing the pins $c\ c$ and $f\ f$, as shown in Figs. 3 and 4. Then to cut segments from sixteen to twenty-two, inclusive, I would use a thirty-one inch guide C and a carrier D with guide-pin holes arranged in arcs ranging from sixteen to twenty-two inches, inclusive. The gage-pins $e\ e$ and $e'\ e'$ regulate the width of the segment-blocks. In making wooden pulleys the segments which are next the web of the pulley are wider than the others, and then pulleys which are from sixteen to twenty-two inches in diameter have rims thicker than those from ten to fifteen inches in diameter, and so on, so that each carrier-block of the series will have the pins $e\ e$ set so as to gage the thickness properly, and they also have the pins $e'\ e'$ for making the "web-cants," as the segments which go next to the web are called. When the pins $e'\ e'$ are used the pins $e\ e$ are shoved up out of the way. In making pulleys it is found desirable that each layer or strata of segments in all pulleys of a certain size have the same number of segments in it, so that all segments of a given radius will be the same length. To do this the blanks S, as they come to the saw-table, are dressed to a proper gage of width to make segment-blocks of a given size, and therefore whenever a change of adjustment in the guide and carrier is made a different-width blank is to be sawed; and as the middle of the blank should always be in line with the middle of the carrier it becomes necessary to alter the adjustment of the push-block $h$, and for convenience I put on the block-scale lines 1, 2, 3, 4, &c., (see Fig. 5,) by which to set the block or stop $h$.

The device shown in Fig. 6 is a guide C with an adjustable arc, and is intended to obviate the use of so many guide-blocks. It consists of a frame, L, which moves in slots $a^2$ in the table A, and can be clamped upon the table at any point by a set-screw in a slot, $l$. It is provided with a flexible guide-face, M, which is provided with a series of radial arms, N, which are slotted, and can be clamped at any point onto the frame L by set-screws $n$. By means of these arms the face M can be set to various curves, and when so set the whole device can be adjusted at various distances from the saw by the set-screw in the slot $l$. When a very large variety of segment-blocks are wanted there would have to be several of these devices employed, with varying capacity perhaps, but not nearly as many as there are guide-boards. However, it is possible that one could be constructed which would serve for all sizes. It is simply a question of bringing the flexible bar M into every desired position.

The operation of sawing segments by my system, whether guide-boards such as are shown in Figs. 1, 2, 3, and 4 or like that in Fig. 6 be used, is as follows: The blanks S being properly prepared and at hand, the operator selects the proper guide (or properly adjusts the guide) and puts it in proper position upon the saw-table. He also selects the proper carrier-board D and adjusts the pins $f$ in the proper place, and the gage $h$ is properly adjusted, when everything is ready to proceed with the sawing. The first cut, S', is made by placing the block T in front of the blank against the pins $e\ e$ or $e'\ e'$, as the case may be; or the carrier D can be tilted down so that the blank will set against it and not under it. The next cut is made with the curved end of the blank in place against the gage-pins $e$. This cut is a segment-block, and so on all that follow. In feeding the stuff to the saw the operator has one hand on the blank, keeping it up in place against the pins, and the other on the left side of the carrier, and the thumb over the block $g$. The center of motion of the blank when being sawed is the center of the arc of the guide. The radius of the segment being sawed is the distance of this center from the gage-pins $e\ e$ or $e'\ e'$. The width of the segment is the distance from the saw to the gage-pins. When the segment-blocks are properly mitered and brought together into a ring the outer edge of the ring is a true circle; but the inner edge is wavy or scalloped, the outer and inner arcs of the segment-blocks not being concentric.

What I claim as new is—

1. An apparatus for sawing segment-blocks upon a scroll sawing machine, consisting of a carrier-block which is adapted, as shown, to guide that end of the blank which is to be cut off at one of its sides and has its opposite side provided with guide-pins or guiding devices, in combination with an arc guide secured to the saw-table at the side of the saw and at a sufficient distance therefrom to permit the carrier to pass between it and the saw, substantially as and for the purposes mentioned.

2. An apparatus for sawing segment-blocks of various sizes and radii upon a scroll or band sawing machine, consisting of a carrier-block which holds that end of the blank from which the segment is to be cut at one of its sides and is there provided with gages $e$, $e'$, and $h$, and at the opposite side is provided with adjustable guiding devices, in combination with an arc guide which is adapted, substantially as shown, to be secured to the saw-table at various distances from the side of the saw and to guide the carrier-block so as to feed the blank to the saw on a curve concentric with its arc but with a radius as much less than that of the arc of the said guide as the said guide is distant from the side of the saw, as set forth.

In testimony whereof I affix my signature in presence of two witnesses.

HILEN CANFIELD CROWELL.

Witnesses:
JNO. K. HALLOCK,
C. SEVALLEY.